United States Patent [19]

Nygren

[11] Patent Number: 4,586,400
[45] Date of Patent: May 6, 1986

[54] SOFT SHAFT INTERCONNECTING DEVICE

[75] Inventor: Ingemar Nygren, Danderyd, Sweden

[73] Assignee: Svenska Varv Vindenergi AB, Gothenburg, Sweden

[21] Appl. No.: 502,709

[22] Filed: Jun. 9, 1983

[30] Foreign Application Priority Data

Jun. 24, 1982 [SE] Sweden ............................... 820394

[51] Int. Cl.⁴ ............................................. F16H 37/06
[52] U.S. Cl. ............................................. 74/675; 74/786
[58] Field of Search ............. 74/786, 785, 750 R, 74/751, 752 C, 687, 675

[56] References Cited

U.S. PATENT DOCUMENTS

| | | | |
|---|---|---|---|
| 2,890,604 | 6/1959 | Campbell, Jr. | 74/752 C |
| 3,240,083 | 3/1966 | Stoddard | 74/786 X |
| 3,563,113 | 2/1971 | Harvey | 74/786 |
| 4,078,452 | 3/1978 | Rosler | 74/752 C |
| 4,341,132 | 7/1982 | Burdick | 74/687 |
| 4,353,269 | 10/1982 | Hiersig | 74/687 X |
| 4,387,783 | 6/1983 | Carman | 74/751 X |
| 4,446,756 | 5/1984 | Hagin et al. | 74/687 |

FOREIGN PATENT DOCUMENTS

| | | | |
|---|---|---|---|
| 315013 | 2/1934 | Italy | 74/786 |
| 56-32088 | 4/1981 | Japan | 74/687 |

*Primary Examiner*—Leslie A. Braun
*Assistant Examiner*—Dwight G. Diehl
*Attorney, Agent, or Firm*—Holman & Stern

[57] ABSTRACT

A device for providing a "soft shaft" interconnection between a prime mover and a driven machine, such as a turbine and an electric generator in a wind power plant, wherein the shafts of the two machines are coaxially aligned and are interconnected by a gearing, operatively connected to a hydraulic fluid pump/motor unit fitted between a high pressure accumulator and a low pressure accumulator in a hydraulic circuit so that the hydraulic circuit provides a predetermined torque dependency for the shaft interconnection. The gearing may be enclosed in a housing adapted to rotate about the shafts, the hydraulic unit being driven by the movements of the housing. Alternatively the hydraulic unit may be operated by a gear wheel meshing with a gear wheel, journalled in a stationary gearing housing.

11 Claims, 4 Drawing Figures 4,586,400

SOFT SHAFT INTERCONNECTING DEVICE

BACKGROUND OF THE INVENTION

1. Field of the Invention

The present invention relates to a device adapted to provide a "soft shaft" interconnection between two machines, preferably between a turbine and an electric generator in a wind power plant. The basic purpose for such an arrangement is to permit an angular displacement between the shafts of the turbine and the generator, which influences the torsional vibration activity.

A "soft shaft" device according to the invention is preferably arranged to limit the magnitude of the torque transmitted. Any attempt to transfer a higher load will result in unrestricted slipping.

2. Description of the Prior Art

A number of "soft shaft" devices are known in the art, but as far as known none of them solves the problems involved in design and operation in a satisfactory manner.

SUMMARY OF THE INVENTION

The object of the present invention is to overcome this deficiency in prior devices and to provide a favorable alternative, based upon simple and reliable component and design solutions.

In a broad sense the invention provides to a device adapted to permit a load-depending angular displacement between the output shaft of a prime mover, for instance a turbine, and the input shaft of a second machine, for instance a generator, preferably a limited angular displacement between the two shafts. The invention is characterized in that the shafts are coaxially aligned and interconnected by a gearing operatively connected to a hydraulic fluid pump/motor unit located in a circuit between two hydraulic fluid accumulators.

The gearing is in one embodiment enclosed in a housing rotatably about said shafts. In a further embodiment the hydraulic fluid pump/motor unit operates against a gear wheel rotatable independent of a stationary gearing housing.

A maximum torque is preferably determined by an overflow valve at the high pressure side of the circuit, opening at a predetermined pressure.

When the load is reduced a counteracting torque of a predetermined lowest magnitude is provided by the pump/motor unit operating as a meter by the pressure difference caused by fluid flowing from the high pressure side to the low pressure side. An overflow valve is included in the low pressure side of the circuit, which opens at a predetermined highest pressure, and thereby determines the magnitude of the counteracting torque.

When the pressure in the high pressure portion of the circuit reaches the level determined by the overflow valve, and the pressure in the low pressure portion has been reduced to the minimum value determined by a supply pump, the pressure difference in the system has attained its highest value. Thereafter the device will operate as a slipping clutch, permitting an unlimited, constant torque transfer.

For starting the system and for preventing cavitation when the hydraulic unit operates as a pump, a pump is preferably provided in the low pressure portion of the circuit for raising the pressure within the system to a predetermined value.

The pump is preferably governed by the pressure in the circuit to maintain the pressure above a level where the risk of cavitation is removed.

BRIEF DESCRIPTION OF THE DRAWINGS

The invention will now be described in detail with reference to the accompanying drawings, wherein.

DETAILED DESCRIPTION

Figure 1:
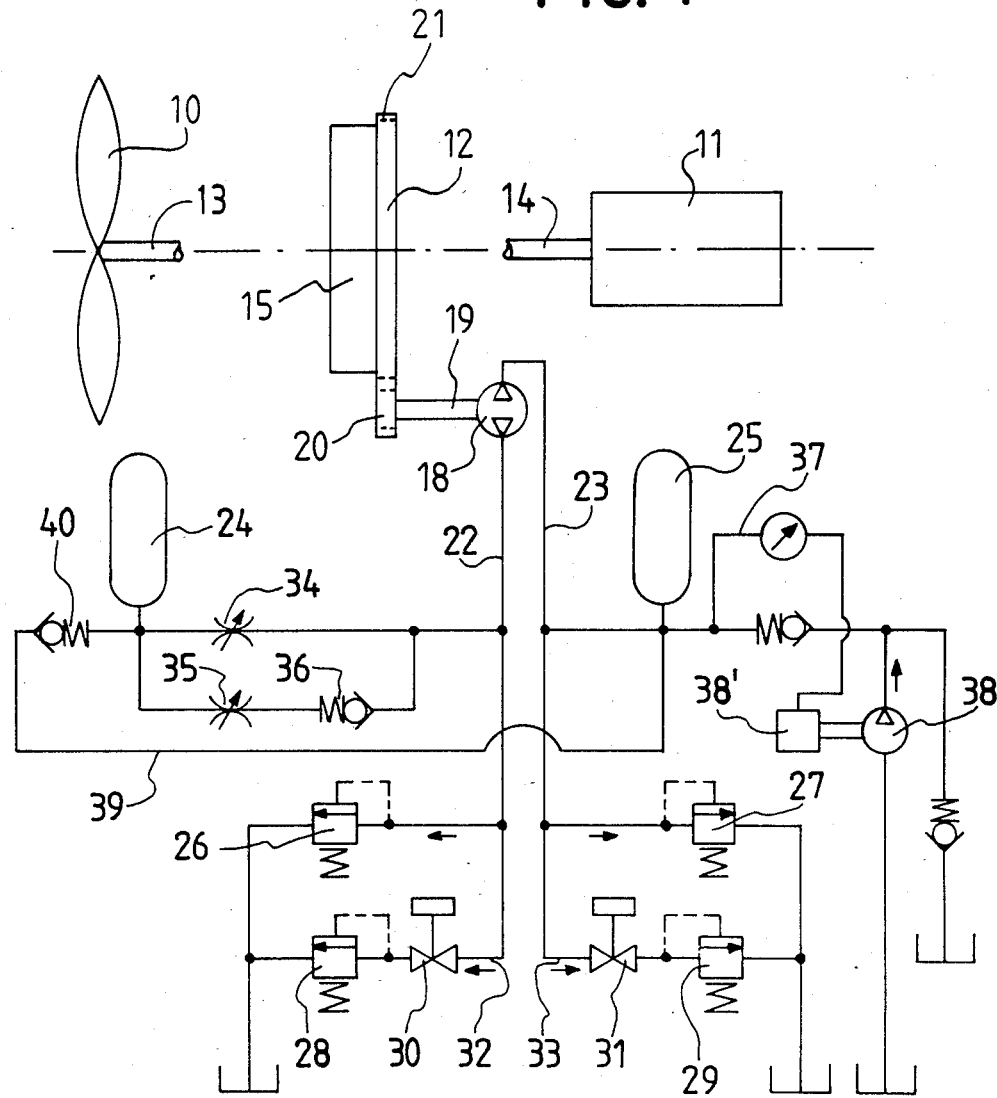
FIG. 1 is a schematic view of a "soft shaft" arrangement and a hydraulic circuit according to a preferred embodiment of the invention.

In FIG. 1, numbers 10, 11 and 12 refer to a turbine, an electric generator and a gearing, respectively, forming part of a wind power plant. The gearing 12 is fitted between the coaxially aligned output and input shafts 13 and 14. The shafts are journalled in a housing 15, which is carried by the shafts and rotatable in relation thereto. The purpose of this arrangement is to permit rotation of the housing in relation to the torque differences between shafts 13 and 14. The housing 15 is provided with an external gear ring 21, which meshes with a pinion 20 on a shaft 19, drivingly connected to a hydraulic machine 18 operable as a pump or as a motor. If, for instance, shaft 14 is suddenly braked, while simultaneously shaft 13 continues to rotate and supplies a certain torque, the housing 15 will be rotated and this movement will operate the hydraulic machine.

The hydraulic machine forms part of a hydraulic fluid circuit and communicates, in the first hand, by way of conduits 22 and 23 with a high pressure and a low pressure accumulator 24 and 25, respectively. The accumulators are intended to provide the torque characteristics illustrated in FIG. 2 by solid line 46. For comparison, the characteristics of a conventional torsion spring arrangement between the shafts is shown by a broken line 47.

Figure 2:
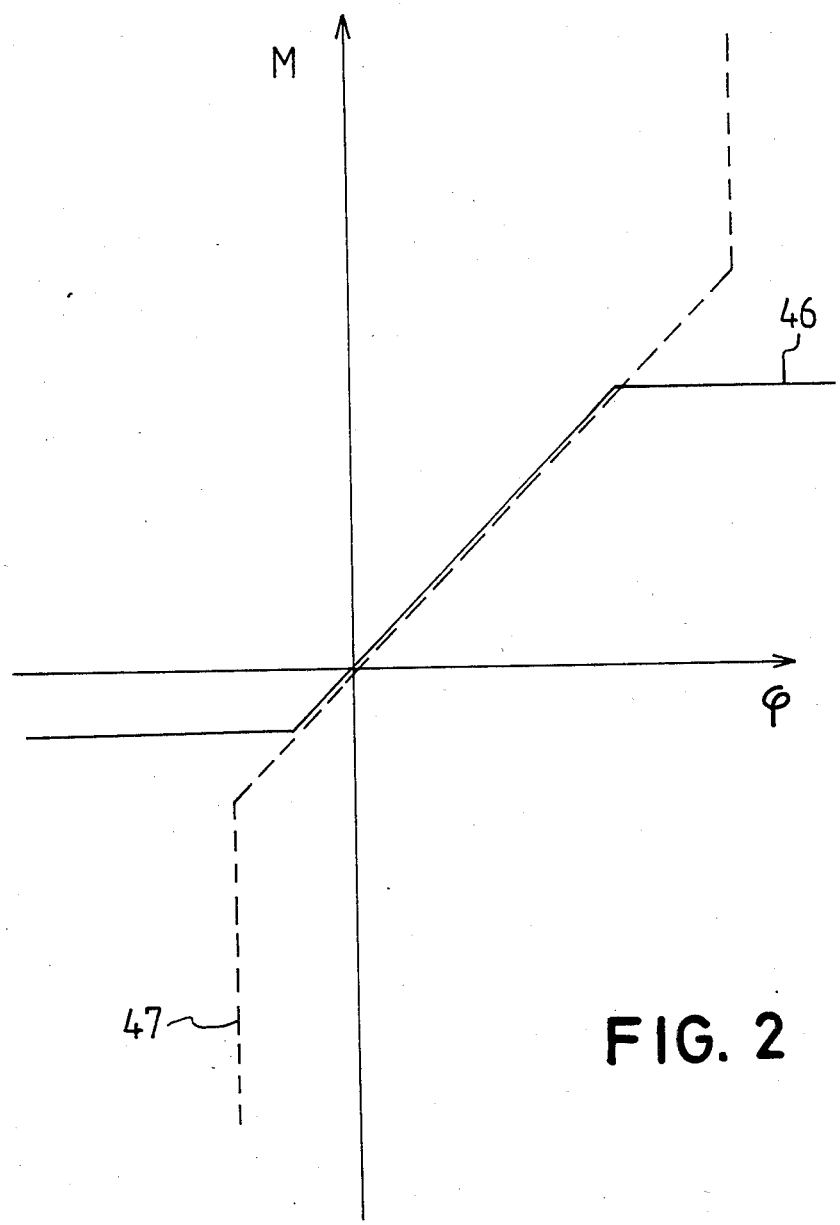
FIG. 2 is a diagram illustrating the torque characteristics of the transmission/gearing between the turbine and the generator shown in FIG. 1.

The high pressure portion of the hydraulic circuit includes an overflow valve 26, which basically determines the positive maximum value of the solid line torque characteristic line in FIG. 2. A further overflow valve 27 in the low pressure portion of the circuit determines the maximum "negative" value. The activity may in other words be described as the constant values indicated in FIG. 2 being determined by a pressure difference, which, in turn, is determined by the upper and the lower pressure level, respectively, in the high pressure and in the low pressure portion.

In parallel to the overflow valves above referred to, further overflow valves 28, 29 are provided in conduits 32 and 33, which may be opened or closed by means of valves 30, 31. These are opened to facilitate starting by reducing the maximum torque to a value, which is noticeably lower than the torque causing slip in ordinary operation. The valves furthermore make it possible to switch in the generator 11 upon the electric network without any introductory phasing-in. The opening pressures of valves 28, 29 are selected so low, that a corresponding torque from the network cannot force the generator out of phase. During normal operation both valves 30, 31 are closed.

The high pressure portion of the hydraulic circuit further includes a shunting arrangement comprising two adjustable throttle valves 34, 35 arranged in parallel. In the branch conduit, or shunt pipes, including the latter valve, a non-return valve 36 opening in the direction of flow towards accumulator 24 is provided in series with valve 35. The aim is to ensure a high sensibility in the system (or rather at the overflow valve 26) with respect to rapidly varying torques, as the dampening in the direction towards the high pressure accumulator 24 will be lower than in the opposite direction, due to the shunting arrangement. The idea is to provide a low in-flow resistance, but a high out-flow resistance to and from the high pressure accumulator 24, respectively, whereby a high dampening combined with a low increase in pressure is obtained, when the load is increased.

In the low pressure portion of the circuit there is a pump 38 connected to a source of fluid supply and governed by the occasional fluid pressure. At a predetermined minimum pressure at the inlet to the low pressure accumulator 25, sensed by way of a signal conduit 37, a motor 38' driving the pump is activated in order to prevent cavitation in the low pressure inlet to the pump-/motor unit 18, when this forces fluid into the high pressure portion of the circuit. The pump 38 will thus maintain a minimum pressure in the circuit in order to prevent cavitation. This applies to the high pressure portion as well as to the low pressure portion. This pump is also used to start up the circuit.

The system operates, in short, in the following manner.

During normal operation of the wind power turbine 10 the torque will vary with changes in the prevailing wind conditions. The gear housing 15 will then rotate between occasional equilibrium positions.

The pump/motor unit 18 will transfer fluid forwards and backwards between the two accumulators 24 and 25, as the case may be, and the system operates as if the gear housing 15 was elastically supported with respect to torsion. The unit 18 is also referred to as a hydraulic machine of the type which operates as a pump when driven by turbine 10 through gearing 12. The machine, as knwon, also operates as a motor to drive the gearing 12 when fluid is driven through it by the pressure in the accumulators. In other words, the energy stored in the accumulators when the machine ordinarily is driven as a pump drives the machine as a motor when the ordinary power fails. The gear housing 15 will always tend to reach an equilibrium position. As the fluid within the circuit is always transferred from one accumulator to the other, and as the accumulators have progressive resistance curves, the resulting curve will be about rectilinear (see the inclined portion of the characteristics line 46 in FIG. 2). The shunting connection 34-36 causes a small reduction of pressure in the direction towards the accumulator 24, while the outflow therefrom is subjected to a noticeable throttling.

If a peak torque should be applied, the housing will pass its equilibrium position and the pressure in the high pressure portion of the circuit will rise to a value corresponding to the opening pressure at the overflow valve 26, which thereafter will maintain the pressure at a constant value (see the upper, horizontal portion of the characteristics line in FIG. 2). Fluid will then be transferred from the low pressure accumulator 25 through the hydraulic machine 18 and out by way of overflow valve 26. As long as the peak load prevails the housing rotates about the shafts, thus providing unrestricted slipping.

When the pressure in the low pressure portion of the circuit has been reduced to its minimum level, which is determined with respect to the risk for cavitation, the pump 38 starts automatically and maintains the pressure in the low pressure portion of the circuit at a constant value. The pump 38 is driven by a motor 38', which is governed by the pressure at the inlet to the low pressure accumulator 25 by way of the signal conduit 37. The system will thus, basically, act as a slipping clutch between the turbine and the generator, with an unlimited angle of rotation $\phi$ (see FIG. 2).

If the electric network, for one reason or the other, should be cut out, there will occur a backlash in the hydraulic system, during which fluid is forced from the high pressure portion of the circuit to the low pressure portion. When the pressure in the low pressure portion has risen to an upper predetermined level, the overflow valve 27 will open, and will thereafter maintain the pressure at a constant value. This pressure will determine the magnitude of the opposed maximum torque (see the left hand, horizontal portion of the characteristics line in FIG. 2). The pressure in the high pressure portion of the circuit will continue to sink until it reaches the same value as in the low pressure portion. Thereafter fluid will be circulated through a connecting conduit 39 between the low pressure portion and the high pressure portion. This includes a non-return valve 40, which normally maintains conduit 39 closed. The system will also, on this occasion, act as a slipping clutch (however in a direction opposite that of the previously described occasion) with an unlimited angle torque $\phi$, see FIG. 2.

When the wind power plant is started it is necessary that the speed of the generator 11 is about the same as the synchronous speed. When switching-in a big generator to the electric network it is, above the synchronous speed, also necessary to ensure a correct phase position. The arrangement according to the present invention makes it possible to use a so called "Russian phasing-in" with moderate size generators, without any consideration to phase conditions. To that end the conduit includes an overflow valve 28, 29 in each of its high pressure and low pressure portions, respectively. These valves open at a pressure which is so low that the corresponding torque from the electric network cannot force the generator out of phase. When the phasing-in period is terminated the conduits 32 and 33 are shut off by means of valves 30, 31, whereupon the output from the generator may be increased.

The only action needed when starting the plant is to raise the pressure in the low pressure side of the circuit to a predetermined lower level. The pressures and the resulting pressure difference will then automatically be built up as the plant begins to run.

The hydraulic pump/motor unit 18 may also be used to reverse the turbine by operating the unit 18 as a motor in the manner explained above, i.e., the pressure in the accumulators can be used to drive the unit 18 which in turn drives the gearing 12 which drives the shaft 13. During such operation the shaft 14 may be locked and the external gear ring 21, and gear housing 15, and thereby also shaft 13, are rotated. Such reversing may have to be done for instance when overhauling the rotor.

Figure 3:
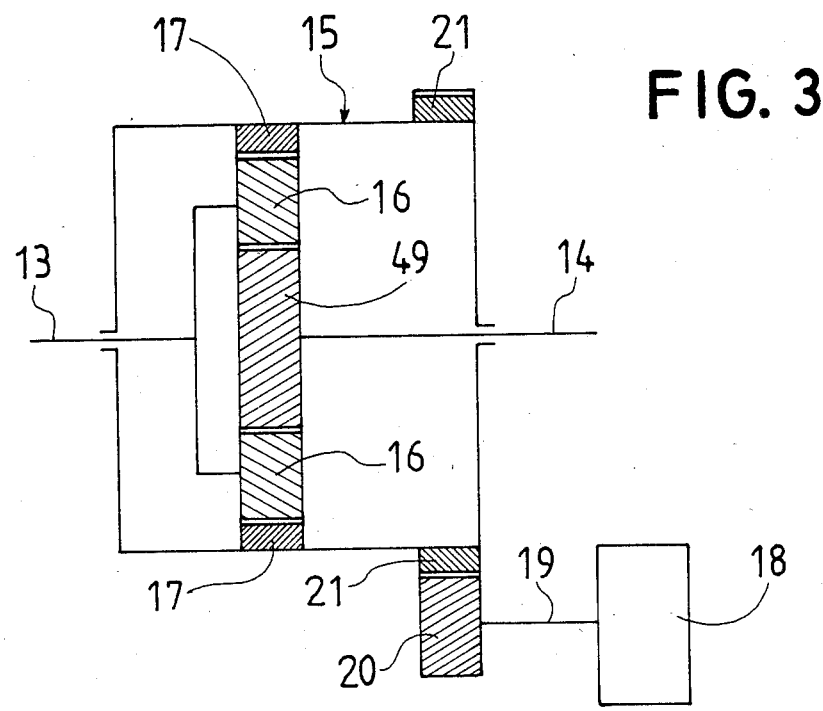
FIG. 3 is a schematic cross-sectional view on a larger scale of the gear housing indicated in FIG. 1 and rotatable about the coaxially aligned input and output shafts.

FIG. 3 shows the housing and the gearing therein more in detail. The gearing is a planetary gearing, where shaft 13 is connected to the carrier for the planet wheels 16, while shaft 14 is connected to the sun wheel of the gearing.

An internal gear ring 17 at the housing meshes with the planets 16, and should a torque difference occur between shafts 13 and 14, ring wheel 17 will turn the housing 15 in relation to the aligned shafts 13 and 14.

Figure 4:
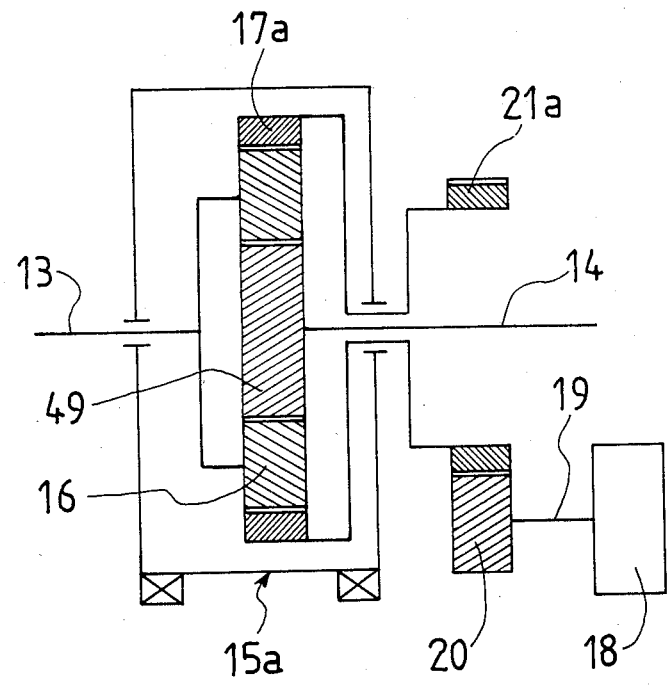
FIG. 4 is a view similar to FIG. 3 showing a further embodiment of the gearing housing being stationary and supporting an externally rotatable gear wheel, drivingly connected to the hydraulic unit.

FIG. 4 shows a modified embodiment, where the housing 15a is stationary. The gearing is of the same type as in FIG. 3, but the ring wheel 17a is rotatably journalled upon shaft 14 and carries a gear wheel 21a, which thus can rotate independently of the stationary housing.

The planetary gearings shown in FIGS. 3 and 4 can be substituted by gear trains of conventional kind, the important feature being that there is a rotatable member (21 or 21a) which reacts to torque differences and drives the hydraulic machine 18 in one direction or the other.

I claim:

1. A soft shaft connecting device for use between a prime mover having an output shaft and a machine driven by the prime mover having an input shaft coaxially aligned with the output shaft comprising:
   a planetary gearing having a sun gear connected to one of said shafts, a carrier connected to the other of said shafts, planetary gears rotatably mounted on said carrier and meshing with said sun gear, and a ring gear mounted for rotation coaxially with respect to said shafts enclosing and operatively meshing with said planetary gears;
   a hydraulic machine operable as a pump and a motor operatively connected to said ring gear so that it operates as a pump when driven by said ring gear and as a motor driven by hydraulic fluid pressure to drive said ring gear;
   conduit means for conducting hydraulic fluid operatively connected to said hydraulic machine;
   a high pressure accumulator and a low pressure accumulator operatively connected to said conduit means so that said hydraulic machine is connected between said accumulators; and
   means to control the flow of hydraulic fluid through said hydraulic machine to attenuate differences in torque between said input and output shaft comprising,
      a first adjustable throttling means operatively connected to said conduit means between said hydraulic machine and said high pressure accumulator,
      a shunt pipe connected to said conduit means in parallel with said first throttling means,
      a second adjustable throttling means operatively connected to said shunt pipe,
      a non-return valve operatively connected to said shunt pipe in series with said second throttling means to open in the direction of fluid flow towards said high pressure accumulator, and
      an overflow valve operatively connected to said conduit means on the same side of said hydraulic machine as said high pressure accumulator and operable to open at a predetermined pressure to limit the maximum fluid pressure in said conduit means.

2. A device as claimed in claim 1, wherein the portion of said conduit including said low pressure accumulator further includes a second overflow valve opening at a predetermined pressure to control the pressure in said portion of the conduit.

3. A device as claimed in claim 1, wherein said conduit includes a connection between said high pressure and said low pressure accumulator provided with a non-return valve opening in the direction of flow towards said high pressure accumulator.

4. A device as claimed in claim 1, wherein said conduit includes a further pump adapted to supply hydraulic fluid from a source to the portion of said conduit including said low pressure accumulator.

5. A device as claimed in claim 4, and further comprising a driving means for said further pump, and means responsive to the pressure in said low pressure accumulator portion of said conduit to actuate said driving means to maintain said pressure above a predetermined value in order to prevent cavitation when said hydraulic machine transfers fluid from said low pressure accumulator.

6. A device as claimed in claim 1 and further comprising:
   a housing enclosing said planetary gearing and mounted for rotation about said input and output shafts;
   an external gear wheel mounted externally on said housing to rotate therewith;
   a gear wheel operatively connected to said hydraulic machine to drive and be driven thereby in meshing engagement with said external gear wheel; and
   said ring gear being mounted internally on said housing.

7. A device as claimed in claim 1 and further comprising:
   a stationary housing enclosing said planetary gearing;
   a second carrier mounted for rotation relative to said housing and having a portion external of said housing, said ring gear being mounted on said second carrier within said housing;
   an external gear wheel mounted on said portion of said second carrier external of said housing; and
   a gear wheel operatively connected to said hydraulic machine to drive and be driven thereby in meshing engagement with said external gear wheel.

8. A "soft shaft" connecting device for use between a prime mover having an output shaft and a machine driven by the prime mover having an input shaft coaxially aligned with the output shaft, comprising:
   a planetary gearing having a sun gear connected to one of said shafts, a carrier connected to the other of said shafts, planetary gears rotatably mounted on said carrier and meshing with said sun gear, and a ring gear mounted for rotation coaxially with respect to said shafts enclosing and operatively meshing with said planetary gears;
   a hydraulic machine operable as a pump and a motor operatively connected to said ring gear so that it operates as a pump when driven by said ring gear and as a motor driven by hydraulic fluid pressure to drive said ring gear;
   conduit means for conducting hydraulic fluid operatively connected to said hydraulic machine;
   a high pressure accumulator and a low pressure accumulator operatively connected to said conduit means so that said hydraulic machine is connected between said accumulators;

means including valve means operatively connected to said conduit means to control the flow of hydraulic fluid through said hydraulic machine to attenuate differences in torque between said input and output shafts;

a further pump adapted to supply hydraulic fluid from a source to the portion of said conduit including said low pressure accumulator;

driving means for said further pump; and means responsive to the pressure in said low pressure accumulator portion of said conduit operatively connected to said driving means to actuate said driving means to maintain said pressure above a predetermined value in order to prevent cavitation when said hydraulic machine transfers fluid from said flow pressure accumulator.

9. A device as claimed in claim 8, wherein said conduit means includes branch conduits connectable by further valve means to said high pressure and said low pressure accumulators, respectively, and an overflow valve in each branch conduit.

10. A device as claimed in claim 8 and further comprising:

a housing enclosing said planetary gearing and mounted for rotation about said input and output shafts;

an external gear wheel mounted externally on said housing to rotate therewith;

a gear wheel operatively connected to said hydraulic machine to drive and be driven thereby in meshing engagement with said external gear wheel; and said ring gear being mounted internally on said housing.

11. A device as claimed in claim 8 and further comprising:

a stationary housing enclosing said planetary gearing;

a second carrier mounted for rotation relative to said housing and having a portion external of said housing, said ring gear being mounted on said second carrier within said housing;

an external gear wheel mounted on said portion of said second carrier external of said housing; and a gear wheel operatively connected to said hydraulic machine to drive and be driven thereby in meshing engagement with said external gear wheel.

* * * * *